United States Patent
Hong et al.

(10) Patent No.: US 9,295,974 B2
(45) Date of Patent: Mar. 29, 2016

(54) FLOATING TYPE ADSORBENT FOR REMOVAL OF PHOSPHATE IN AQUEOUS SOLUTION AND METHOD FOR FABRICATING THE SAME AND METHOD FOR REGENERATION OF THE SAME

(71) Applicant: KOREA INSTITUTE OF SCIENCE AND TECHNOLOGY, Seoul (KR)

(72) Inventors: Seok Won Hong, Seoul (KR); Sanghyup Lee, Gunpo-si (KR); Kyung Guen Song, Seoul (KR); Eunhoo Jeong, Seoul (KR); Jae Woo Choi, Seoul (KR)

(73) Assignee: KOREA INSTITUTE OF SCIENCE AND TECHNOLOGY, Seoul (KR)

( * ) Notice: Subject to any disclaimer, the term of this patent is extended or adjusted under 35 U.S.C. 154(b) by 286 days.

(21) Appl. No.: 13/900,109

(22) Filed: May 22, 2013

(65) Prior Publication Data
US 2014/0183405 A1 Jul. 3, 2014

(30) Foreign Application Priority Data

Dec. 27, 2012 (KR) .................. 10-2012-0154618

(51) Int. Cl.
*B01J 20/26* (2006.01)
*B01J 20/32* (2006.01)
*B01J 20/34* (2006.01)
*B01J 20/28* (2006.01)

(52) U.S. Cl.
CPC .............. *B01J 20/3475* (2013.01); *B01J 20/26* (2013.01); *B01J 20/28045* (2013.01); *B01J 20/3231* (2013.01); *B01J 20/3257* (2013.01)

(58) Field of Classification Search
None
See application file for complete search history.

(56) References Cited

U.S. PATENT DOCUMENTS

| 5,498,409 A * | 3/1996 | Hirayama | ................ B01J 20/22 424/78.14 |
| 2005/0252863 A1* | 11/2005 | Wurth | .................. B01J 20/0229 210/681 |
| 2010/0264084 A1* | 10/2010 | Midorikawa | ........... B01D 63/02 210/631 |

FOREIGN PATENT DOCUMENTS

| JP | 5-68969 | 3/1993 |
| JP | P2009-274040 A | 11/2009 |
| KR | 10-0449443 | 9/2004 |
| KR | 10-0537890 | 12/2005 |

OTHER PUBLICATIONS

Havens et al. Reusable Immobilized Enzyme/Polyurethane Sponge for Removal and Detoxification of Localized Organophosphate Pesticide Spills. Ind Eng Chem Res. 1993, 32, 2254-2258.*

Oh et al., "Preparation of novel ceramic membranes modified by mesoporous silica with 3-aminopropyltriethoxysilane (APTES) and its application to $Cu^{2+}$ separation in the aqueous phase", Journal of Membrane Science, vol. 301, 2007, pp. 118-125.

Hongmei Li et al.,Fabrication and nonlinear optical properties of untrathin films containing sulfonate funtionalized fullerenes,Chemical Physics Letters,Dec. 2, 2003,383(2004) 230-234 Pages, Chemical Physics Letters 383, Harbin Institute of Technology, Harbin, China.

* cited by examiner

*Primary Examiner* — Tanisha Diggs
(74) *Attorney, Agent, or Firm* — Goldilocks Zone IP LAW

(57) ABSTRACT

The present disclosure relates to a floating type adsorbent for removal of phosphate that can effectively remove phosphate from aqueous phase through reaction between an amine function attached on the surface of a sponge and phosphate. This adsorbent can be regenerated by desorbing the adsorbed phosphate, a method for fabricating same and a method for regeneration the floating type adsorbent for removal of phosphate. The floating type adsorbent for removal of phosphate according to the present disclosure is fabricated by immersing a sponge in a mixture solution of an amine precursor and anhydrous toluene to form an amine function on the surface of the sponge. The amine precursor may be 3-aminopropyltriethoxysilane (APTES) and the APTES and the anhydrous toluene may be mixed at a volume ratio of 0.5-1:1.

4 Claims, 3 Drawing Sheets

FLOATING TYPE ADSORBENT FOR REMOVAL OF PHOSPHATE IN AQUEOUS SOLUTION AND METHOD FOR FABRICATING THE SAME AND METHOD FOR REGENERATION OF THE SAME

CROSS-REFERENCE TO RELATED APPLICATION

This application claims priority to Korean Patent Application No. 10-2012-154618, filed on Dec. 27, 2012, and all the benefits accruing therefrom under 35 U.S.C. §119, the contents of which in its entirety are herein incorporated by reference.

BACKGROUND

1. Field

The present disclosure relates to a floating type adsorbent for removal of phosphate, a method for fabricating same and a method for recycling the floating type adsorbent for removal of phosphate. More particularly, the disclosure relates to a floating type adsorbent for removal of phosphate that can effectively remove phosphate in water through reaction between an amine group attached on the surface of a sponge and phosphate. This adsorbent can be regenerated by desorbing the adsorbed phosphate, a method for fabricating same and a method for regeneration the floating type adsorbent for removal of phosphate.

2. Description of the Related Art

In order to remove phosphate ($PO_4$-P) existing in water, biological treatment, coagulation-sedimentation, crystallization, adsorption, etc. are employed. Among them, biological treatment and coagulation-sedimentation are widely used.

Biological treatment has some drawbacks in that the concentration of inorganic nutrients in effluent water is relatively high and processing efficiency is low. Although coagulation-sedimentation using a coagulant is preferred due to ease of processing and high efficiency, excessive use of the coagulant brings concerns.

Meanwhile, adsorption is a method of removing phosphate using an adsorbent. As a representative example, Korean Patent No. 537890 discloses a method of removing nitrogen and phosphorus compounds from sewage and wastewater using loess balls. However, the loess ball is not easy to regenerate after use and is inconvenient in handling because of heavy weight.

Recently, removal of pollutants from water using a urethane sponge is actively studied. The sponge has a potential in industrial application since it has a large volume-to-weight ratio and is recyclable.

REFERENCES OF THE RELATED ART

Patent Documents (Patent document 1) Korean Patent No. 537890

SUMMARY

The present disclosure is directed to providing a floating type adsorbent for removal of phosphate that can effectively remove phosphate in water through reaction between an amine group attached on the surface of a sponge and phosphate. This adsorbent can be regenerated by desorbing the adsorbed phosphate, a method for fabricating same and a method for recycling the floating type adsorbent for removal of phosphate.

In one aspect, there is provided floating type adsorbent for removal of phosphate fabricated by immersing a sponge in a mixture solution of an amine precursor and anhydrous toluene to form an amine function on the surface of the sponge.

The amine precursor may be 3-aminopropyltriethoxysilane (APTES) and the APTES and the anhydrous toluene may be mixed at a volume ratio of 0.5-1:1. In addition, an inert gas may be supplied to the mixture solution of the amine precursor and the anhydrous toluene in order to prevent evaporation of the anhydrous toluene. The sponge has a porous structure and may be foamed from a natural or synthetic resin.

The floating type adsorbent for removal of phosphate according to the present disclosure may include a sponge and an amine group provided on the surface of the sponge. The amine function may be formed from amination and the amination may be achieved by immersing the sponge in a mixture solution of 3-aminopropyltriethoxysilane (APTES) and anhydrous toluene.

In another aspect, there is provided a regeneration method of floating type adsorbent for removal of phosphate, including immersing a floating type adsorbent for removal of phosphate in a 0.5-1 v/v % sulfuric acid solution to remove phosphate captured on the surface. The floating type adsorbent for removal of phosphate comprises a sponge and an amine function provided on the surface of the sponge, the amine function being from amination. The amination being achieved by immersing the sponge in a mixture solution of 3-aminopropyltriethoxysilane (APTES) and anhydrous toluene and the APTES and the anhydrous toluene being mixed at a volume ratio of 0.5-1:1.

A floating type adsorbent for removal of phosphate, a method for fabricating same and a method for recycling the floating type adsorbent for removal of phosphate according to the present disclosure provide the following positive effects.

Since the floating type adsorbent consists of a sponge, it has superior water permeability. Further, since it has a large specific surface area and has an amine function formed on the surface, it has improved phosphate removal efficiency. In addition, it can be easily regenerated by removing adsorbed phosphate using sulfuric acid and thus can be recycled many times.

BRIEF DESCRIPTION OF THE DRAWINGS

The above and other aspects, features and advantages of the disclosed exemplary embodiments will be more apparent from the following detailed descriptions taken in conjunction with the accompanying drawings in which.

DETAILED DESCRIPTION

Exemplary embodiments now will be described more fully hereinafter with reference to the accompanying drawings, in which exemplary embodiments are shown.

A floating type adsorbent for removal of phosphate according to the present disclosure consists of a sponge on which an amine group ($-NH_2$) is attached and removes phosphate ($PO_4$-P) existing in water while floating in water.

Since the sponge has a porous structure and thus has large volume and specific surface area per weight. It may be advantageous in contacting with phosphate in sewage and wastewater. The sponge may be foamed from a natural or synthetic resin by intumescent method. The synthetic resin may be a urethane-based synthetic resin.

An amine function is attached on the surface of the sponge. This adsorbent serves to capture phosphate by chemical reaction with the phosphate. The amine function may be attached on the surface of the sponge through amination.

The amination may be achieved by immersing the sponge in a mixture solution of anhydrous toluene and an amine precursor. As a result of the amination, an amine function is formed on the surface of the sponge. The amine precursor may be used 3-aminopropyltriethoxysilane (APTES). To maximize the formation of the amine function, the APTES and the anhydrous toluene may be mixed at a volume ratio of 0.5-1:1. If the proportion of the APTES is smaller than 0.5 based on the anhydrous toluene, phosphate removal efficiency may be very low. Whereas, if the proportion of the APTES is larger than 1, phosphate removal efficiency is not further improved because the surface of the sponge is saturated with the amine function. In order to prevent evaporation of the anhydrous toluene during the amination, this process may be performed under an inert gas atmosphere. If the anhydrous toluene is evaporated, the APTES may not evenly disperse on the surface of sponge.

The floating type adsorbent for removal of phosphate according to the present disclosure may be regenerated by removing the phosphate captured on the surface. Specifically, the floating type adsorbent for removal of phosphate with the phosphate captured may be immersed in a 0.5-1% (v/v) sulfuric acid solution for a predetermined time to regenerated the floating type adsorbent by desorbing the captured phosphate. Since the floating type adsorbent for removal of phosphate according to the present disclosure is made of a sponge prepared from a natural or synthetic resin, the 0.5-1% (v/v) sulfuric acid solution may be used to prevent chemical etching of the sponge.

Hereinafter, a method for fabricating a floating type adsorbent for removal of phosphate and phosphate removal efficiency of the fabricated floating type adsorbent and regenerated floating type adsorbent will be described in detail through specific examples.

Example 1

Fabrication of Floating Type Adsorbent with Amine Group Attached

Figure 1:
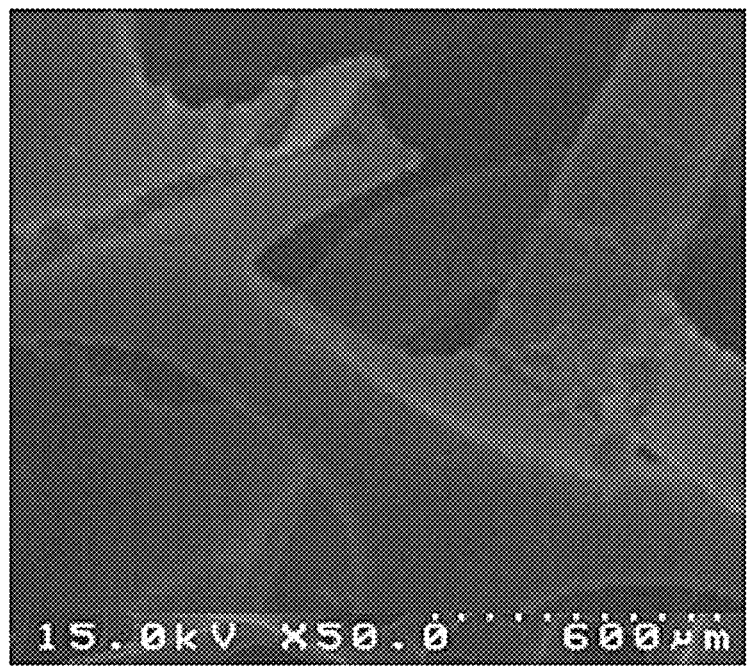
FIG. 1 is an SEM image of a floating type adsorbent for removal of phosphate fabricated according to an exemplary embodiment of the present disclosure.

A cube-shaped sponge (5 cm×5 cm×5 cm) was soaked with flowing tap water for 5 times and then washed for 3 times with distilled water. The washed sponge was dried in an oven of 100° C. for about 20 hours. The dried sponge was cut into smaller cubes (0.5 cm×0.5 cm×0.5 cm) and immersed in 20 mL of mixture solutions of APTES and anhydrous toluene, with volume ratios of 1.5:8.5, 1:4 and 1:1. After 20 hours, the sponge was taken out from each mixture solution and dried in an oven of 100° C. for 10 hours to obtain a sponge with an amine group attached (see FIG. 1).

Example 2

Phosphate Adsorption Experiment 0.1 g of the floating type adsorbent fabricated in Example 1 was added to 50 mL of each of 1, 5, 10 and 20 mg/L phosphate solutions. After 12 hours, the floating type adsorbent was removed and the equilibrium concentration was measured by ion chromatography.

Figure 2:
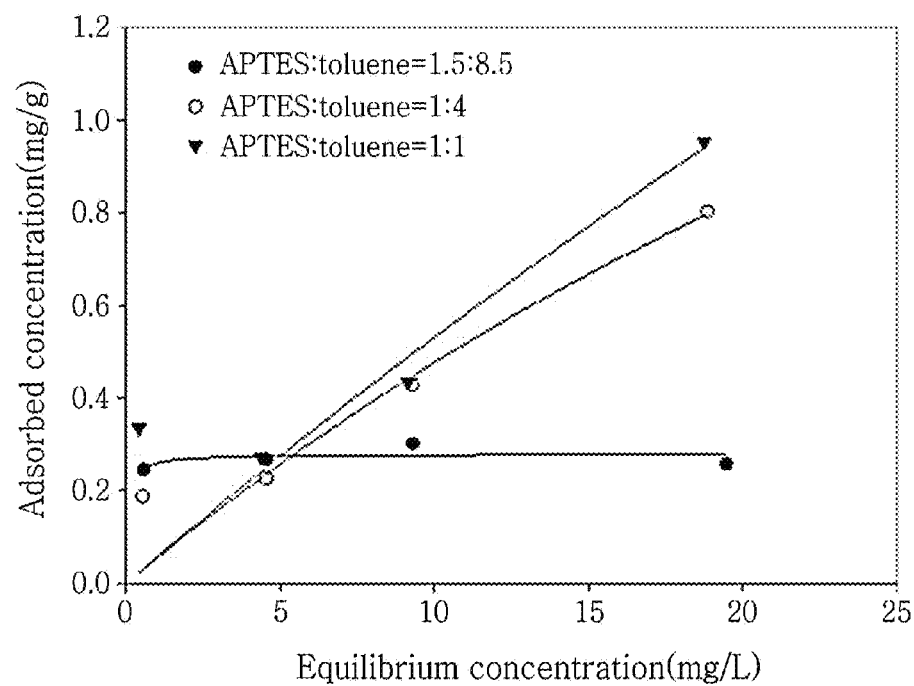
FIG. 2 shows a result of an equilibrium batch experiment for removal of phosphate according to an exemplary embodiment of the present disclosure.

FIG. 2 shows the result of the equilibrium batch experiment. It can be seen that the phosphate removal efficiency changes with the mixing ratio of the APTES and the anhydrous toluene. When the proportion of the APTES was the highest, i.e. at the mixing ratio of 1:1, the maximum adsorption capacity was calculated as 7.801 mg/g from the Langmuir adsorption model. In contrast, when the proportion of the APTES was the lowest, i.e. at the mixing ratio of 1.5:8.5, the maximum adsorption capacity was 0.278 mg/g, giving about 28.1 times smaller adsorption efficiency. From these results, it can be inferred that the formation of the amine function is better induced as the mixing ratio of the APTES to the anhydrous toluene is close to 1:1.

Example 3

Adsorption of Phosphate Using Regenerated Floating Type Adsorbent

After the adsorption experiment in Example 2, the floating type adsorbent was immersed in a 1% (v/v) sulfuric acid solution for 3 hours to desorb the phosphate from the surface. Then, after drying in an oven at 60° C. for about 4 hours, an equilibrium batch experiment was performed in the same method as in Example 2 using 50 mL of 1, 5, 10 and 20 mg/L phosphate solutions. The equilibrium concentration was also measured by ion chromatography.

Figure 3:
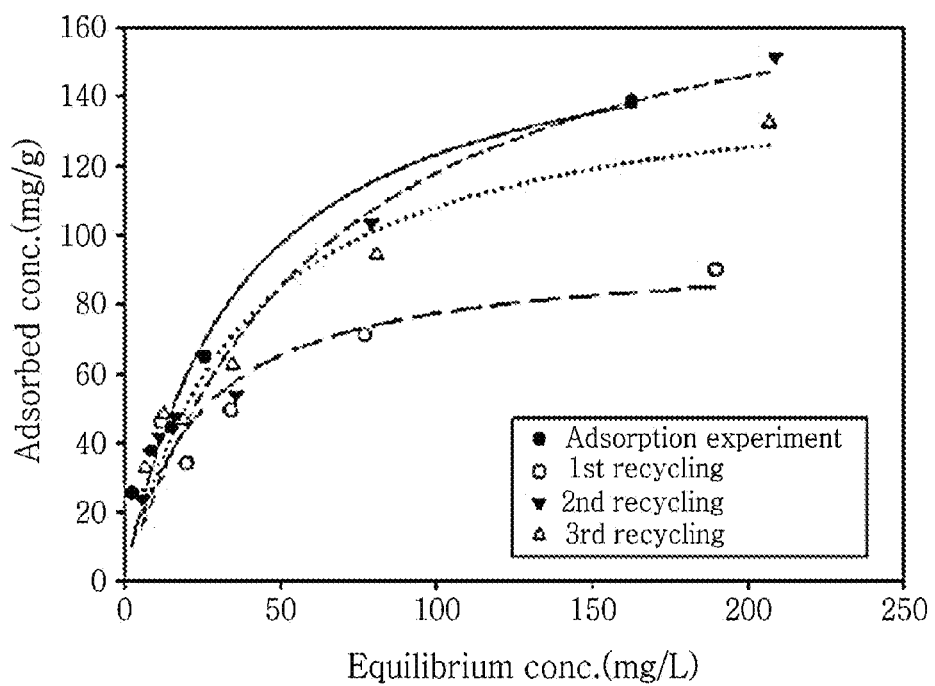
FIG. 3 shows a change in phosphate removal efficiency of a floating type adsorbent regenerated according to an exemplary embodiment of the present disclosure.

FIG. 3 shows the result of the equilibrium batch experiment with the number of recycling. It can be seen that there is no significant change in phosphate adsorption efficiency even when the number of recycling increases. The maximum adsorption capacity of the floating type adsorbent before recycling calculated from the Langmuir adsorption model was 167.77 mg/g. After regeneration, the maximum adsorption capacity was 95.23 mg/g (once), 191.92 mg/g (twice) and 148.86 mg/g (thrice). From this result, it can be inferred that the number of recycling does not have a significant effect on decrease of the maximum adsorption concentration of the floating type adsorbent.

While the exemplary embodiments have been shown and described, it will be understood by those skilled in the art that various changes in form and details may be made thereto without departing from the spirit and scope of the present disclosure as defined by the appended claims.

What is claimed is:

1. A method for regeneration of a floating adsorbent for removal of phosphate, comprising:
    preparing a floating adsorbent which comprises a sponge and an amine functional group provided on the surface of the sponge comprising immersing the sponge in a mixture solution of 3-aminopropyltriethoxysilane (APTES) and anhydrous toluene, wherein the APTES and the anhydrous toluene are mixed at a volume ratio of 0.5-1:1;
    adsorbing phosphate from sewage or water using the floating adsorbent; and immersing the floating adsorbent in a 0.5-1 v/v % sulfuric acid solution to remove the phosphate captured on the surface of the floating adsorbent.

2. The method for regeneration a floating type adsorbent for removal of phosphate according to claim 1, wherein the floating type adsorbent for removal of phosphate is immersed in a 0.5-1 v/v % sulfuric acid solution for about 3 hours.

3. The method for regeneration a floating type adsorbent for removal of phosphate according to claim 1, further comprising drying the floating type adsorbent in an oven for about 4 hours.

4. The method for regeneration a floating type adsorbent for removal of phosphate according to claim 1, further comprising drying the floating type adsorbent in an oven for about 4 hours at a temperature of 60° C.

* * * * *